(12) United States Patent
Junger et al.

(10) Patent No.: US 7,480,263 B2
(45) Date of Patent: Jan. 20, 2009

(54) METHOD AND DEVICE FOR BI-DIRECTIONAL HALF DUPLEX TRANSMISSION OF DATA

(75) Inventors: Andreas Junger, Reutlingen (DE);
Rainer Moritz, Filderstadt (DE); Uwe Lueders, Kusterdingen-Jettenburg (DE);
Berthold Elbracht, Reutlingen (DE);
Jens Haensel, Leonberg (DE);
Wolfgang Kostorz, Weil Der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 751 days.

(21) Appl. No.: 10/498,929

(22) PCT Filed: Oct. 23, 2002

(86) PCT No.: PCT/DE02/03990

§ 371 (c)(1),
(2), (4) Date: Dec. 6, 2004

(87) PCT Pub. No.: WO03/053018

PCT Pub. Date: Jun. 26, 2003

(65) Prior Publication Data

US 2005/0102563 A1    May 12, 2005

(30) Foreign Application Priority Data

Dec. 14, 2001  (DE) ............................... 101 61 656

(51) Int. Cl.
*H04L 5/16* (2006.01)
*G06F 11/00* (2006.01)
*H04B 1/38* (2006.01)
*H04B 3/00* (2006.01)

(52) U.S. Cl. .................. 370/296; 714/18; 375/219; 375/257

(58) Field of Classification Search ............... 714/18; 375/257, 219
See application file for complete search history.

(56) References Cited

U.S. PATENT DOCUMENTS

| 3,366,880 | A | | 1/1968 | Driver |
| 4,739,321 | A | * | 4/1988 | Friedman et al. ............ 370/445 |
| 5,764,727 | A | | 6/1998 | Arnold et al. |
| 5,892,893 | A | | 4/1999 | Hanf et al. |
| 6,094,696 | A | | 7/2000 | Choe et al. |
| 6,198,913 | B1 | * | 3/2001 | Sung et al. ............... 455/343.3 |
| 6,400,308 | B1 | * | 6/2002 | Bell et al. ...................... 342/71 |
| 6,631,159 | B1 | * | 10/2003 | Morris ........................ 375/219 |
| 2002/0093930 | A1 | * | 7/2002 | Dertz et al. .................. 370/337 |

FOREIGN PATENT DOCUMENTS

DE  19946776  *  4/2001

* cited by examiner

*Primary Examiner*—David C Payne
*Assistant Examiner*—Brian J Stevens
(74) *Attorney, Agent, or Firm*—Kenyon & Kenyon LLP

(57) ABSTRACT

A method and a device for bi-directional transmission of data are provided such that an interface for digital communication on a signal line is obtained which is suited for automotive use. In accordance with the present invention, the following are provided: at least one switchable load unit, the load unit of the temporary transmitter being able to be deenergized prior to transmission of the data; and being able to be reenergized after transmission of the data; in each case at least one switchable current-source unit is assigned to the load unit, the current-source unit of the transmitter being able to be clocked to generate the signals to be transmitted via the communication path; and in each case at least one comparator unit is assigned to the load unit, corresponding output signals being generated at the comparator unit of the receiver from the signals transmitted via the communication path.

17 Claims, 11 Drawing Sheets

METHOD AND DEVICE FOR BI-DIRECTIONAL HALF DUPLEX TRANSMISSION OF DATA

FIELD OF THE INVENTION

The present invention relates to a method and a device for the bi-directional transmission of data.

BACKGROUND INFORMATION

Methods and devices for bi-directional transmission of data are known, for instance from automotive and industrial applications within the framework of digital communication via current interfaces.

However, in most cases such methods and devices utilize at least two signal lines to allow bi-directional communication between the communication participants.

SUMMARY

An object of the present invention is to provide a method and a device for bi-directional transmission of data, in such a way that an interface for digital communication on a signal line is produced that is suitable for automotive use.

According to the present invention, a bi-directional serial transmission of the data available in the form of signals takes place in master/slave operation on the basis of current modulation, using only one signal line which is configured as communication path.

The data are exchanged between at least two communication participants, the communication participants essentially being symmetrically configured, each communication participant including: at least one switchable load unit; at least one switchable current-source unit, which is assigned to the load unit; and at least one comparator unit, which is assigned to the load unit.

According to the present invention, each of the two communication participants is assigned the function of a transmitter at least temporarily during transmission of the data, i.e., at least for the duration of the data transmission, or is assigned the function of a receiver at least temporarily, i.e., at least for the duration of the data transmission.

In other words, the communication participants connected to the communication path are able to be alternately switched as active, current-injecting transmitter, or as passive receiver, in that the following steps take place: the load unit of the transmitter is deenergized prior to transmission of the signals; the current-source unit of the transmitter is clocked for generation of the signals to be transmitted via the communication path; the signals generated in this way are transmitted via the communication path, so that corresponding output signals are produced at the comparator unit assigned to the receiver; and the load unit of the transmitter is reenergized after transmission.

As a result of the current-modulation possibilities, the present invention not only achieves a high signal-to-interference ratio, but, due to utilization of the at least one load unit, also obtains minimal EMC (electro-magnetic compatibility) radiation because of minimal signal-voltage levels, the signal-voltage levels resulting as the product of the resistance value of the load unit and the modulated current intensity.

By way of example, it is possible in this context to select low terminating impedances for the load unit on the order of twelve ohms, for example, and to select current intensities on the order of a few $10^{-2}$ amperes for the current modulation, so that the signal-voltage levels are on the order of magnitude of a few tenths volt.

Accordingly, the characteristic variables of the present interface device, which may be configured as RSI (radar sensor interface), are approximately 8 microseconds in an exemplary bit time and approximately twenty milliamperes at an exemplary signal level "high". Due to the low terminating impedance, not only is the EMC radiation minimized but high EMC irradiation resistance is achieved as well in an analogous manner.

According to an example embodiment of the present invention, the data may be encoded using a variety of codes, for example at least one cyclical code, in particular the Abramson code, the Hamming code, the Manchester code or the Manchester II code.

If, for the sake of expediency, the Manchester code, in particular the Manchester II code, is adopted in both communication directions to encode the digital information, higher data rates may be obtained via self-synchronizing encoding of the digital data for the communication in both directions. Furthermore, this technical measure ensures security during the data transmission, especially in Manchester II encoding.

When the Manchester code is used, the synchronization takes place in the middle of a pulse, specifically a data pulse, and, due to the edge change taking place there in each case, the synchronization is thus always possible in a precise and advantageous manner. In Manchester encoding, the time duration between two synchronization instants in the pulse middle is expediently utilized as the time interval representing the clock frequency.

To be able to utilize another advantage of Manchester encoding, namely the one-bit error detection, both pulse halves are expediently sampled at least once in the pulse middle prior to and after the synchronization instants. Sampling is advantageously performed by multiple sampling within one sampling window; as a result, the advantages regarding the communication direction from a peripheral unit to a control unit are maintained in their entirety and may be simultaneously used in the other direction.

As a result, a simultaneous, bi-directional data transmission of both communication participants is possible in accordance with the present invention, it being possible to perform the transmission in an synchronous manner.

One skilled in the art in such electric and electronic circuits will appreciate not only the very low latency periods offered by the present invention, but also the possibility of an operation even at small supply voltages. Furthermore, such a skilled person will also value a certain robustness with respect to offsets in the supply voltage and to grounds as well as with respect to transition resistances between (temporary) transmitter and (temporary) receiver.

According to an example embodiment of the present invention, the communication path, which is configured as signal line between the communication participants, is assigned at least one diagnosis-comparator unit for wake-up ("wake-up" mode) of the device after it has been operated in sleep mode ("sleep" mode).

As a result, both the method and the device according to the present invention are not only configured to be able to sleep and wake up, but, due to the implementation of the diagnosis-comparator unit, also include a multitude of diagnostic functions for faults on the signal line.

Independently of, or in connection with, the sleep mode or wake-up mode, the device may also be brought into a tristate mode by deenergizing the load unit of the temporary receiver and the current-source unit. A so-called tristate check may be made in this connection in bus systems within digital circuits if the components connected to the data bus—the communication participants in the present case—are able to be alternately switched to active, current-injecting transmitter or to inactive ("tristate"), zero-current receiver.

During the tristate check, it is then determined whether the tristate state is reached and how long the state change is lasting. The tristate check in the sense of a parameter test is based on a current measurement or a leakage-current measurement.

A common method used for this purpose is to inject current at the pins to be checked via a resistor in a high-resistance manner. In the tristate state, the pins to be measured must not influence the predefined voltage value, i.e., the pins must then be between the maximally permitted low level and the minimally allowed high level. During the functional test, the switchover times for active→inactive transition and inactive→active transition are measured as well.

In accordance with an example embodiment of the present invention, it is possible to acknowledge to the transmitter the state of a full receive buffer of the receiver by means of at least one buffer-comparator unit connected in parallel to the comparator unit; this allows the transmitter to be automatically blocked when the receive buffer of the receiver is full. To this end, at least one buffer-comparator unit may each be connected in parallel to the comparator unit; the state of a full receive buffer is able to be acknowledged to the transmitter by the buffer-comparator unit of the receiver.

In accordance with an example embodiment of the present invention, the device is able to be operated by at least one additional switchable current-source unit as an in particular modular and/or as in particular programmable PAS system for the conditioning of electrical and non-electrical measured variables for the computer metrology; as a result, the present invention is fully compatible with the initiation-current interface PAS interface.

Finally, the present invention is directed to the use of a method in accordance with the afore-described type and/or the at least one device according to the afore-described type as component of at least one integrated switching circuit, in particular at least one ASIC (application specific integrated circuit), for at least one radar sensor interface unit of at least one radar system, in particular for short distances (so-called short range radar system).

For instance, an interface-type connection between at least one radar central control unit (CCU) as control unit and at least one radar sensor as peripheral unit may be implemented using the present invention.

In more general terms, the afore-described digital interface according to the present invention is suited for path-building systems such as sensors of all types in automotive and industrial applications. In this context, the present invention is distinguished, among others, by: a high signal-transmission rate; high intrinsic stability in line-short circuits and/or in line-voltage drops; an automatic collision detection; and a cost-effective hardware and software realization.

Furthermore, the present invention is also distinguished in that the aforementioned advantages are combinable by realizing the switchable receiver resistors in connection with a digital sequencing control in a single circuit arrangement.

DETAILED DESCRIPTION

Figure 1:
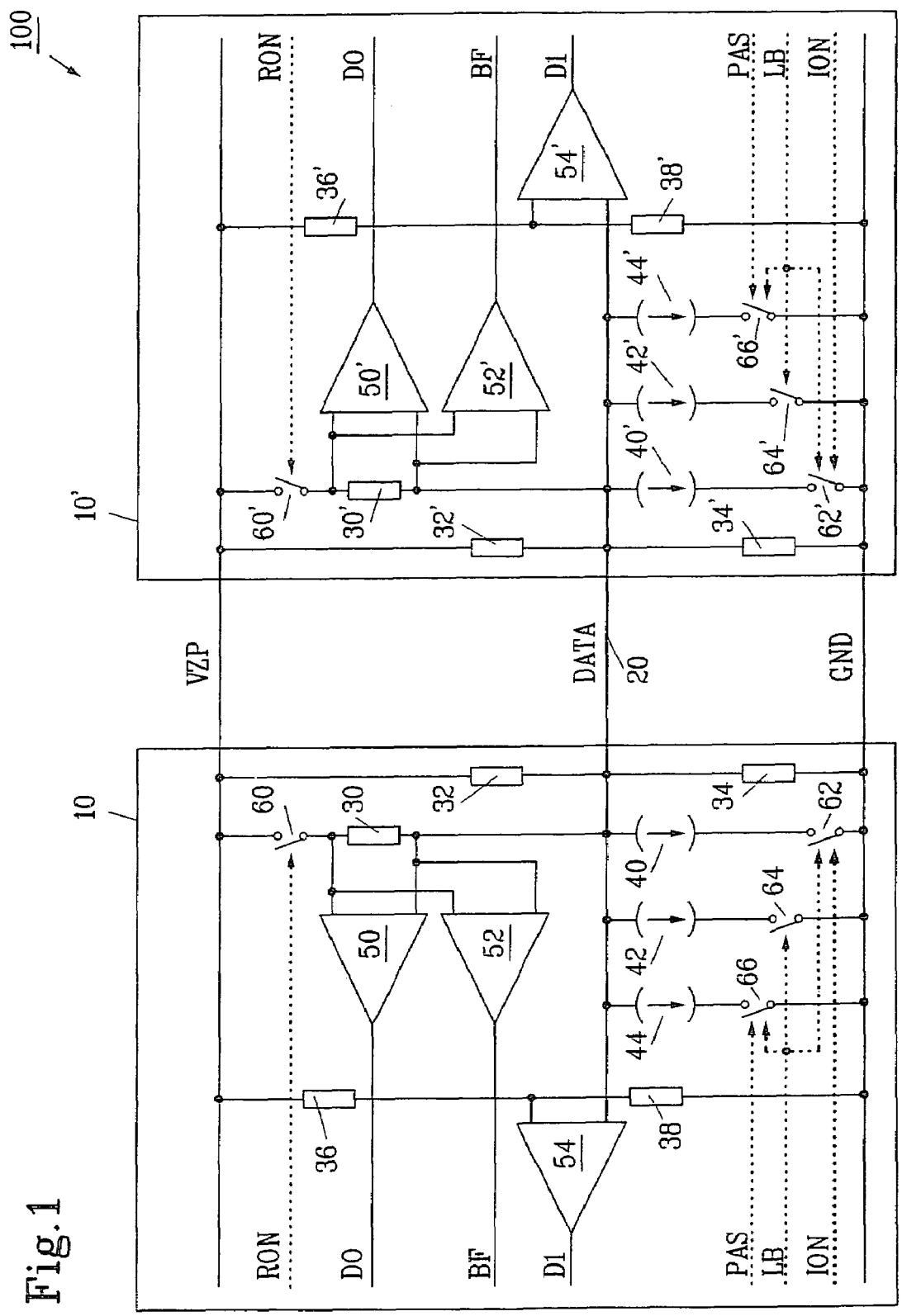
FIG. 1 shows a circuit diagram of an exemplary embodiment of a device according to the present invention.

The schematic circuit diagram of FIG. 1 illustrates an interface device 100, which is configured as RSI (radar sensor interface). This RSI interface is a current-based, bi-directional one-wire interface having Manchester-encoded digital transmission.

The transmission of DATA available in the form of signals uses a communication path (=signal line 20) between two symmetrically configured communication participants 10,

10', namely between a control unit 10 configured as radar control unit (=so-called cluster CA110) and a peripheral unit 10' embodied as radar sensor device (=so-called sensor CA100).

Figure 2:
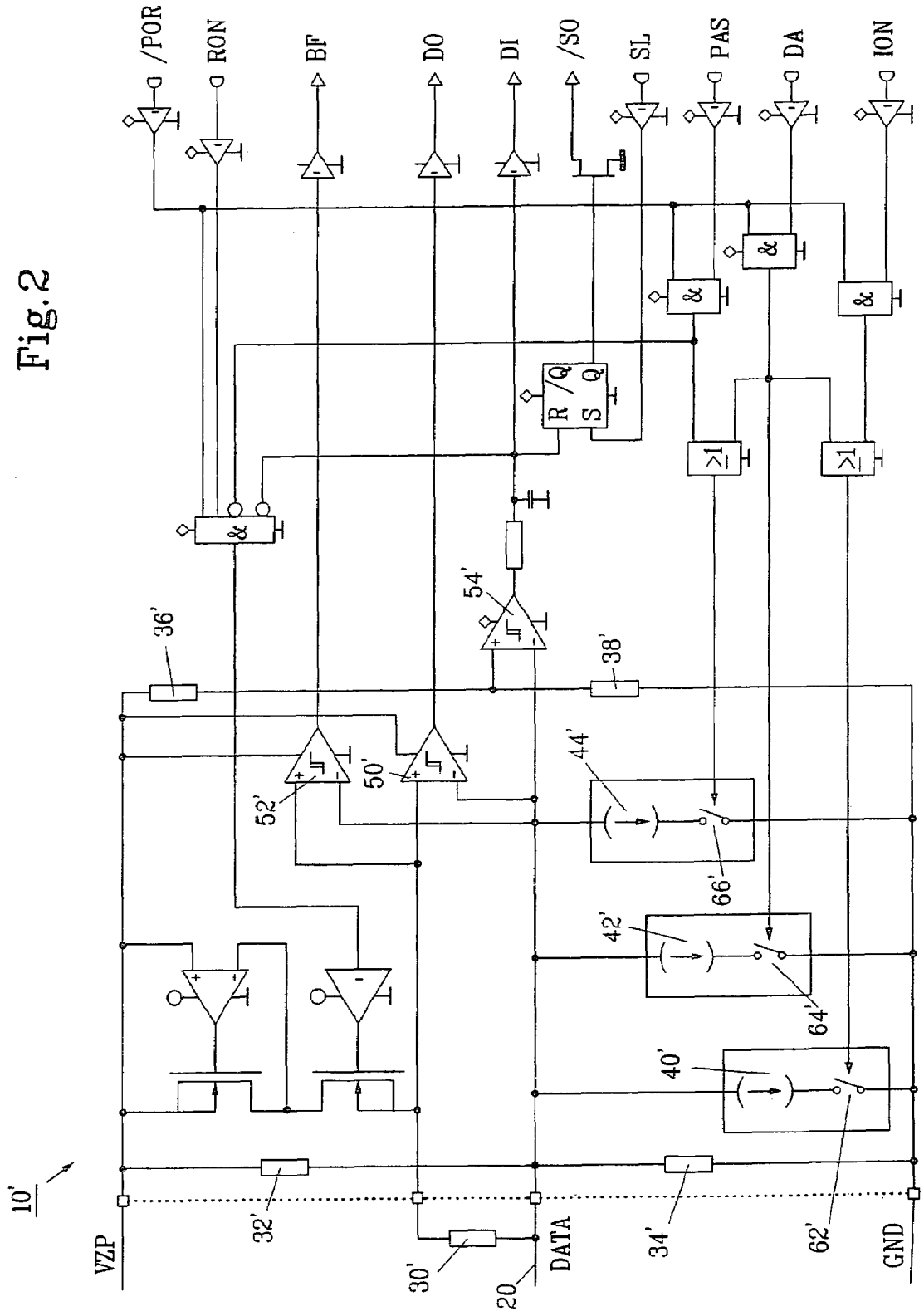
FIG. 2 shows a schematic block diagram of a part of the device shown in FIG. 1.
Figure 3:
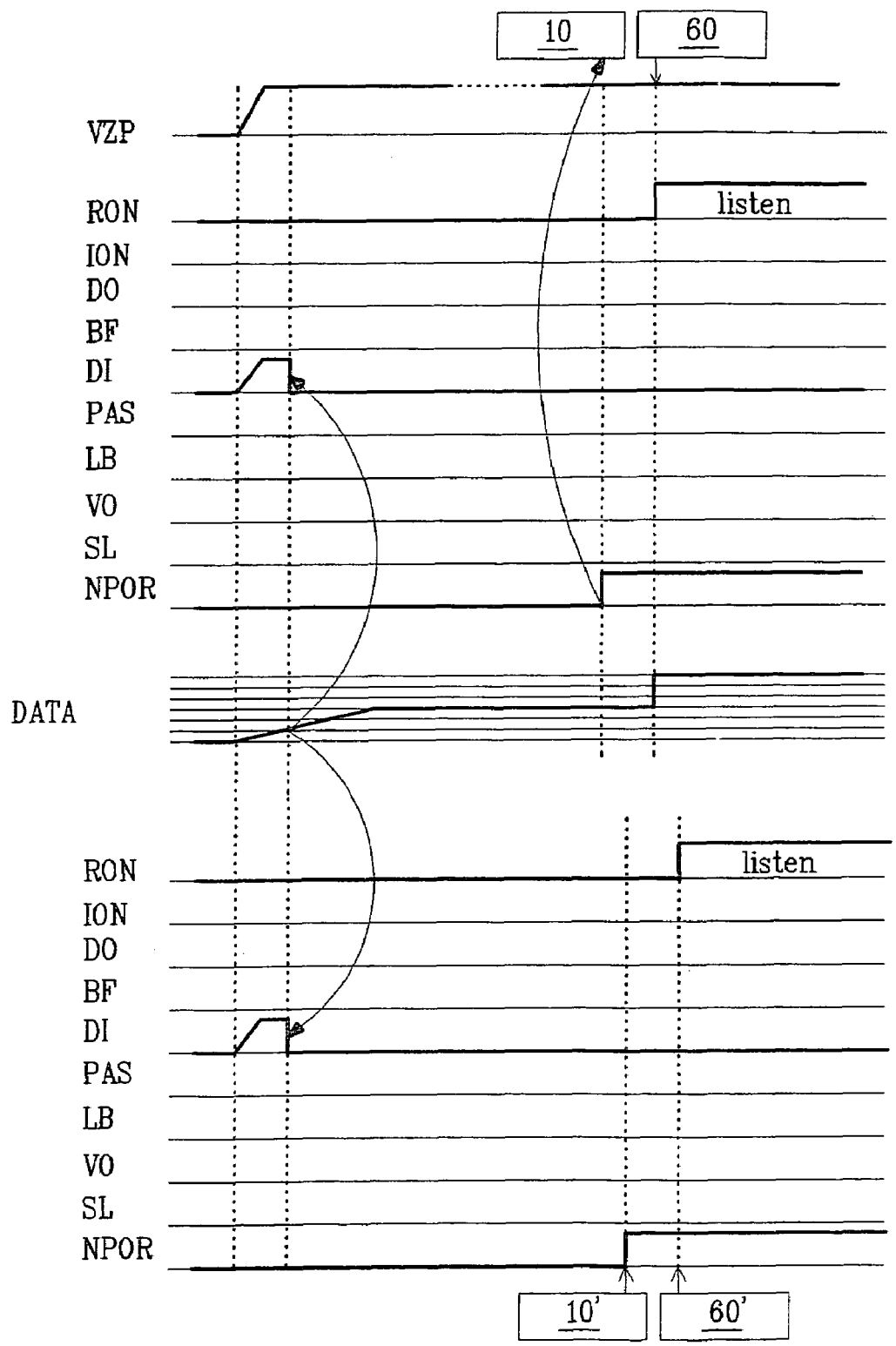
FIG. 3 shows a schematic diagram of the signal time characteristic in the power-up state of the device shown in FIGS. 1 and 2, the upper half of the figure pertaining to the control unit, the middle part to the data to be transmitted in the form of signals, and the lower half of the figure to the peripheral unit.
Figure 4:
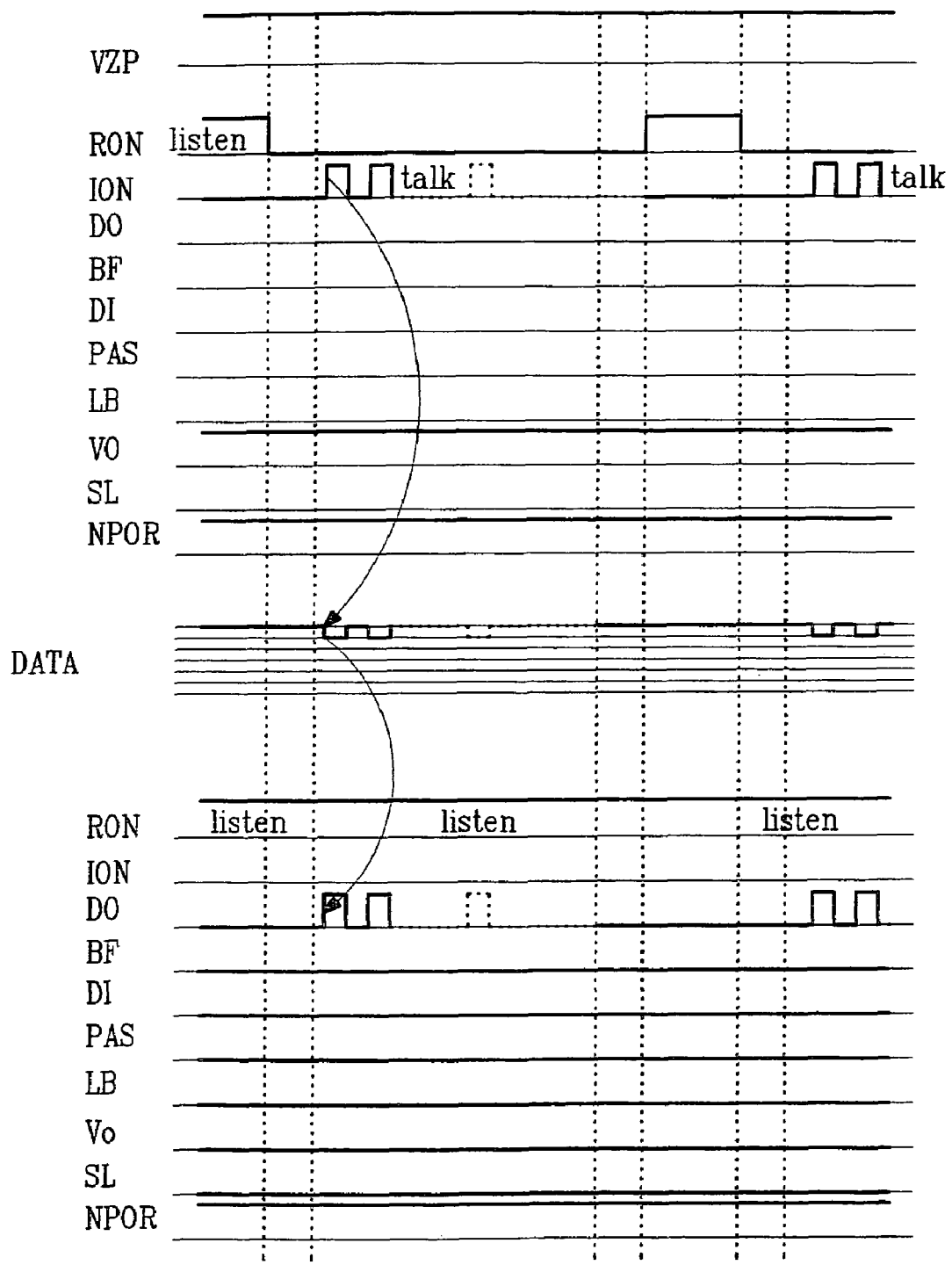
FIG. 4 shows a schematic diagram of the signal time characteristic during data transmission from the control unit to the device shown in FIGS. 1 and 2, the upper half of the figure pertaining to the control unit, the middle part to the data to be transmitted in the form of signals, and the lower part of the figure to the peripheral unit.
Figure 5:
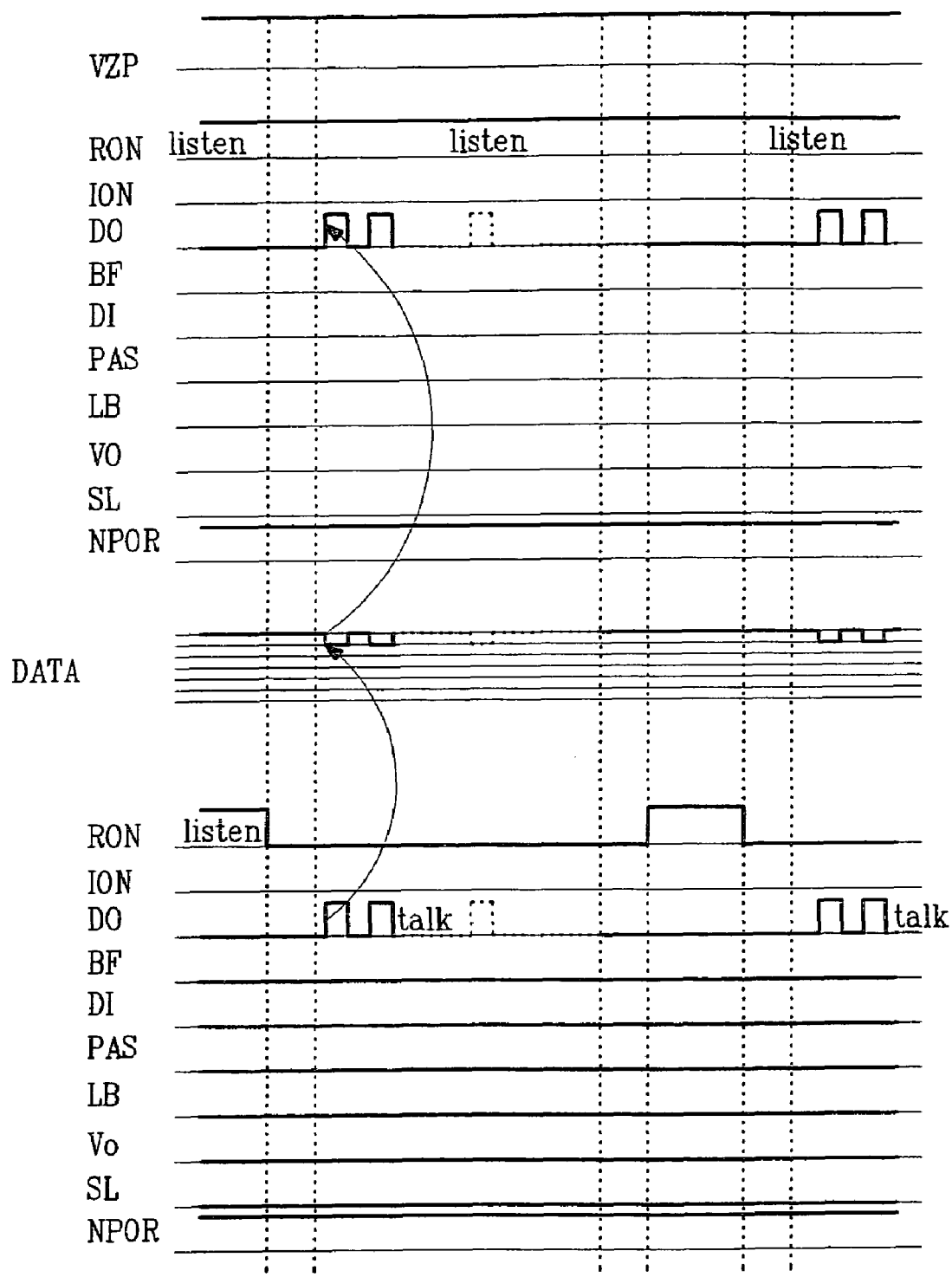
FIG. 5 shows a schematic diagram of the signal time characteristic during data transmission from the peripheral unit to the control unit of the device shown in FIGS. 1 and 2, the upper half of the figure pertaining to the control unit, the middle part to the data to be transmitted in the form of signals, and the lower part of the figure to the peripheral unit.

According to the representation in FIGS. 1 and 2, the two communication participants 10 and 10', which are temporarily assigned the function of a transmitter during transmission of DATA, or which are temporarily assigned the function of receiver, are each assigned an external load unit 30 or 30', respectively, which is switchable by means of a circuit element 60 or 60', respectively (reference sign "RON": resistor on) in the form of a terminating impedance having a resistance value of twelve ohms.

Load unit 30, which is assigned to communication participant 10 acting as temporary transmitter, is deenergized prior to transmission of the DATA and reenergized after transmission of the DATA.

Each load unit 30 or 30' is assigned a current-source unit 40 or 40', respectively, which is switchable via a circuit element 62 or 62' (→reference sign "ION": current source on). In the process, current-source unit 40 of the temporary transmitter is clocked so as to generate the signals to be transmitted via communication path 20.

Furthermore, a comparator unit 50 or 50' assigned to load unit 30 or 30', respectively, may be seen from the representation of FIGS. 1 and 2, corresponding output signals (→reference sign "DO": data output) being generated at comparator unit 50' of the receiver from the signals transmitted via communication path 20.

The principle of the communication, i.e., the transmission of the DATA including the fault treatment, may be seen from FIGS. 3 through 11:

First, communication participant 10 and communication participant 10' are in the so-called "listening mode"(→reference sign "listen" in FIGS. 3 through 11), i.e., load unit 30 of communication participant 10 and load unit 30' of communication participant 10' are energized.

At the beginning of the DATA transmission, the temporary transmitter (=communication participant 10) deenergizes its associated load unit 30; this means that communication participant 10 changes to "transmission mode" (→reference sign "talk" in FIGS. 3 through 11) in that current-source unit 40, which is configured for twenty milliamperes, of communication participant 10 acting as temporary transmitter is clocked accordingly, thereby generating the signals to be transmitted via communication path 20.

The current flow corresponding to the signals via communication path 20 results in a current drop at (still energized) load unit 30' of communication participant 10' acting as temporary receiver, so that corresponding output signals are produced at comparator unit 50' assigned to the receiver (→reference sign "DO": data output).

After the transmission of the DATA has ended, load unit 30 of the temporary transmitter is energized again, so that both communication participants 10, 10' are now back in "listening mode" (→reference sign "listen").

Since the assignment of the status "transmitter" to communication participant 10 or the status "receiver" to communication participant 10' is only temporary in each case, i.e., occurs only for the duration of the DATA transmission, another data transmission in the same direction or in the reverse direction may take place after a data transmission has been concluded; in the latter case, the status "transmitter" is then assigned to communication participant 10' or the status "receiver" to communication participant 10.

Figure 6:
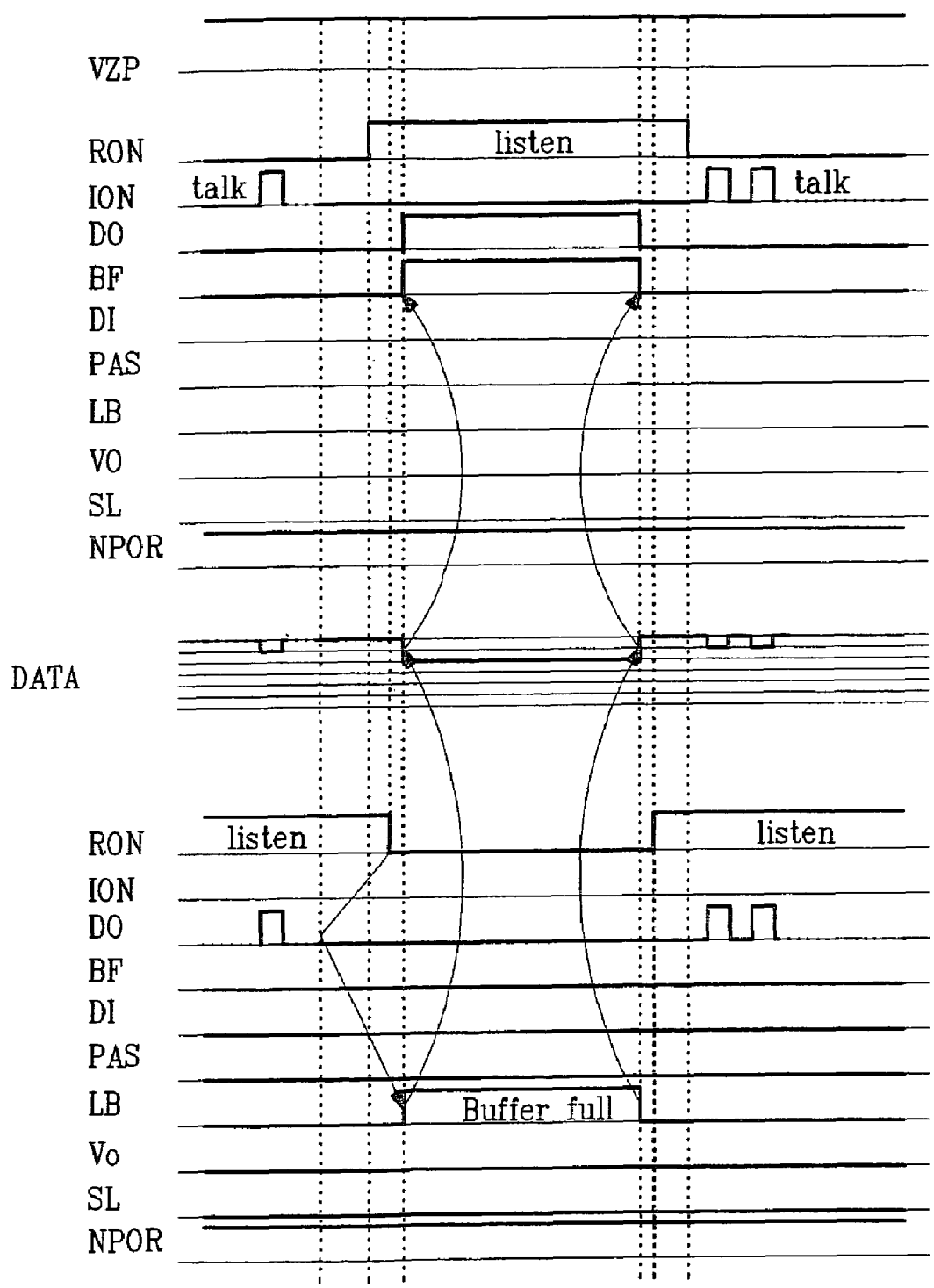
FIG. 6 shows a schematic diagram of the signal time characteristic during data transmission from the control unit to the peripheral unit of the device shown in FIGS. 1 and 2 in the state of a full receive buffer of the receiver, the upper half of the figure pertaining to the control unit, the middle part to the data to be transmitted in the form of signals, and the lower half of the figure to the peripheral unit.

In accordance with the present invention, interface 100 may have not only the afore-described states, but further states as well:

To this end, buffer-comparator unit 52 or 52' is connected in parallel to comparator unit 50 and 50', respectively, it being possible for buffer-comparator unit 52' of the temporary receiver to acknowledge to the transmitter the state of a full receive buffer of the receiver (→reference sign "BF": buffer full), as can be seen from the schematic diagram of the time characteristic of the signal in the state of a full receive buffer of the receiver according to FIG. 6. To this end, a second current-source unit 42 or 42', each of which may be switched by means of a circuit element 64 or 64', is connected in parallel to current-source unit 40 or 40', respectively (→reference sign "LB": line block buffer full).

Figure 7:
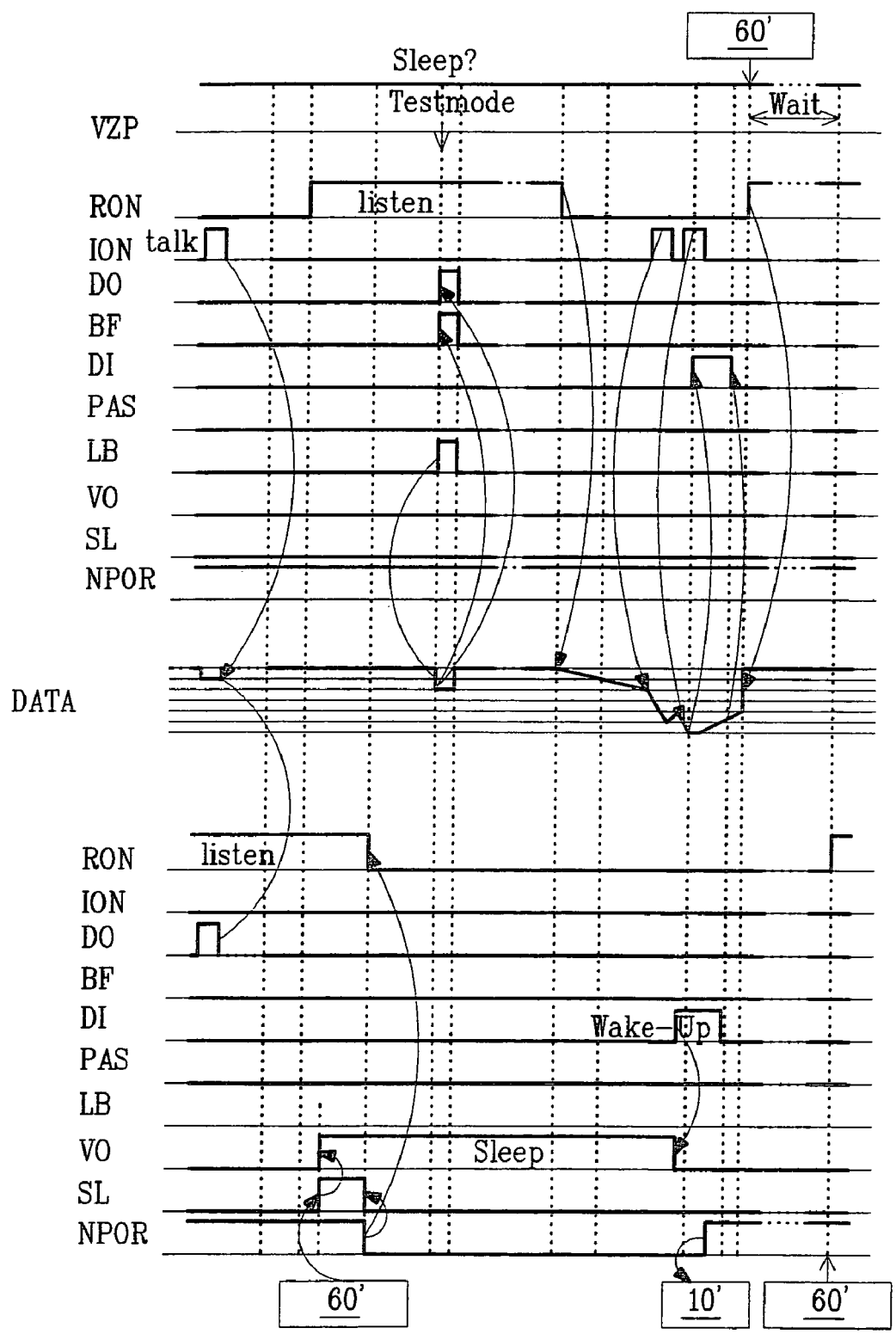
FIG. 7 shows a schematic diagram of the signal time characteristic during the transition of the peripheral unit into the sleep mode or into the wake-up mode of the device shown in FIGS. 1 and 2, the upper half of the figure pertaining to the control unit, the middle part to the data to be transmitted in the form of signals, and the lower half of the figure to the peripheral unit.

As is illustrated with the aid of FIG. 7, device 100 may be brought into a "tristate/sleep" mode (→reference sign "SL": sleep from microprocessor μC) by deenergizing load unit 30' of the temporary receiver as well as current-source unit 40 or 40'. Via a "low" level at communication path 20, a wake-up from this "tristate/sleep" mode may in turn be implemented. To this end, a diagnosis-comparator unit 54 or 54' is assigned to communication path 20 configured as signal line between communication participants 10 or 10' for the waking ("wake up") of device 100 after it has been operated in the rest state ("tristate/sleep" mode). Diagnosis-comparator unit 54 or 54' is energized again during wake-up via the "low" level at communication path 20.

In this context, both the method and device 100 illustrated in FIGS. 1 and 2 are configured to be able to sleep and wake up and furthermore include a multitude of diagnostic functions for faults on the signal line by implementation of diagnosis-comparator unit 54 or 54' (reference sign→"DI": diagnosis).

To this end, the first input ("lower" input in FIG. 1) of diagnosis-comparator unit 54 and 54' is connected to communication path 20, which acts as signal line, whereas the second input ("upper" input in FIG. 1) of diagnosis-comparator unit 54 and 54' is connected between two resistors 36 and 36' and 38 and 38', respectively. Since in the exemplary embodiment of FIG. 1 resistor 36 or 36', which faces supply voltage VZP, is twice as powerful as resistor 38 or 38' facing ground potential or zero potential GND, potential VZP/3 is available at the second input of diagnosis-comparator unit 54 and 54', respectively.

In contrast, communication path 20 acting as signal line, and thus also the first input of diagnosis-comparator unit 54 and 54', is brought to potential VZP/2 in that at least two equally powerful resistors 32 or 32' and 34 or 34', respectively, are connected between supply voltage VZP and ground or zero potential GND in both communication participants 10 and 10', the point of common coupling between communication path 20 acting as signal line and the individual resistance line being located between the two resistors 32 or 32' and 34 or 34', respectively.

Figure 8:
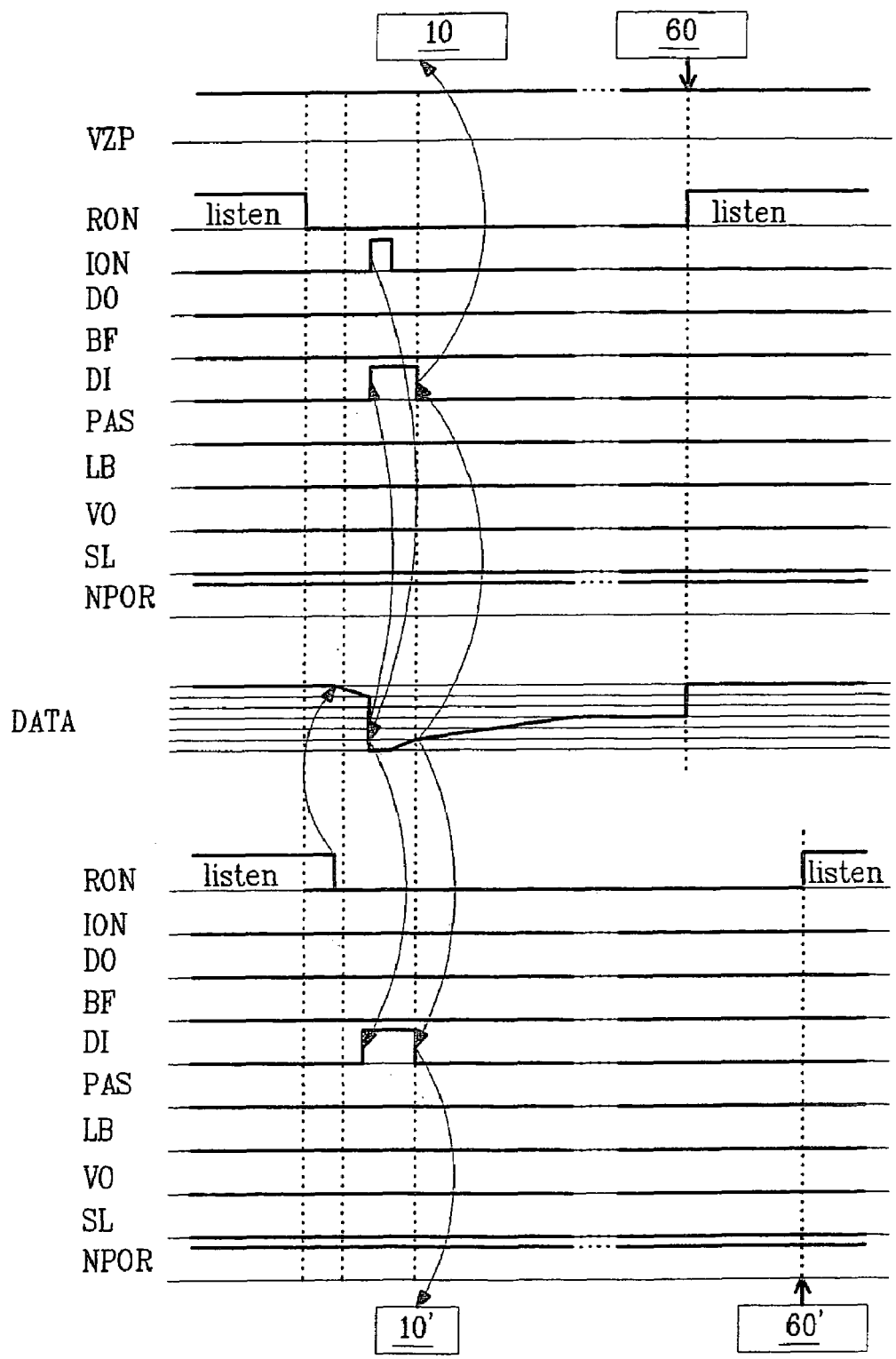
FIG. 8 shows a schematic diagram of the signal time characteristic during data transmission from the control unit to the peripheral unit of the device shown in FIGS. 1 and 2, the upper half of the figure pertaining to the control unit, the middle part to the data to be transmitted in the form of signals, and the lower half of the figure to the peripheral unit.

As can be gathered from the schematic diagram of the signal time characteristic in FIG. 8, the method associated with device 100 also allows a collision detection as well as a re-initialization in the predefined mode (→"master"/"slave").

Figure 9:
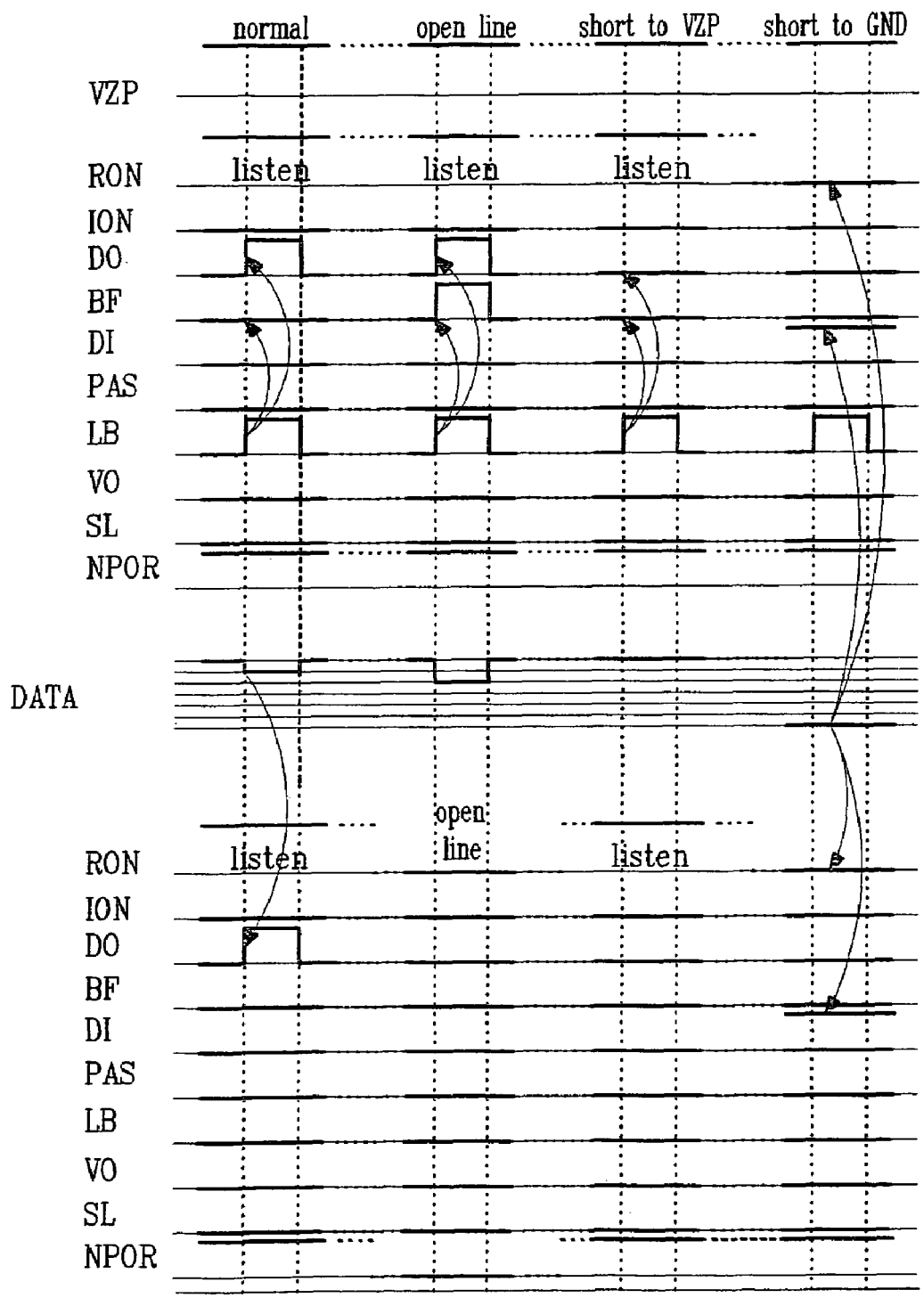
FIG. 9 shows a schematic diagram of the signal time characteristic in the test mode of the device shown in FIGS. 1 and 2, the upper half of the figure pertaining to the control unit, the middle part to the data to be transmitted in the form of signals, and the lower half of the figure to the peripheral unit.

According to the representation shown in FIG. 9, the present method and device 100 allow a line diagnosis in the case of a fault as well, using a test mode (also compare FIG. 7 in this context: "test mode"), with the following results of the test mode being possible:

normal operation is present ("normal"); or signal line 20 is disconnected ("open line"); or a short-circuit to the line of supply voltage VZP is present ("short to VZP"); or a short-circuit to the line of ground or zero potential GND is present ("short to GND").

Figure 10:
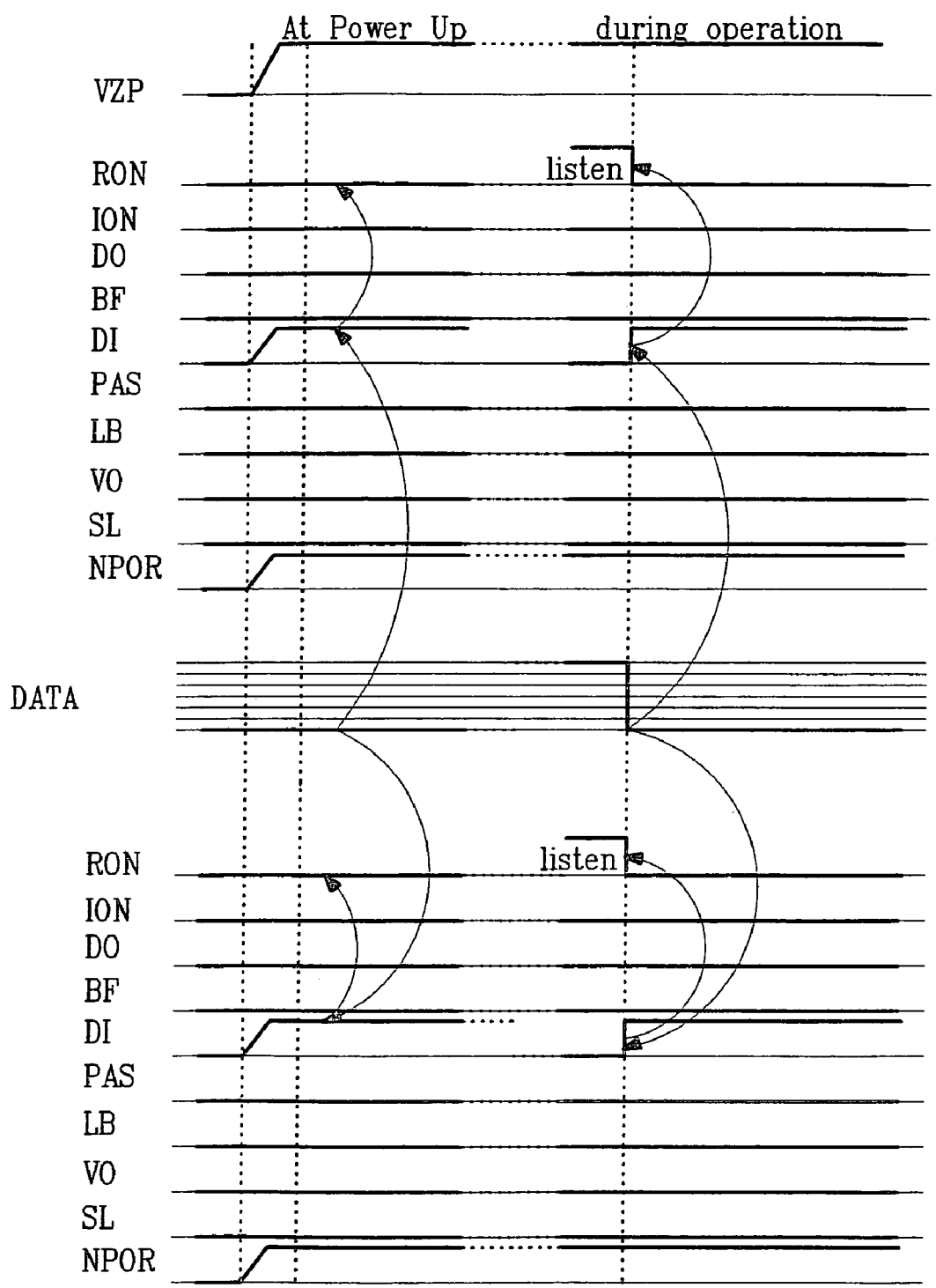
FIG. 10 shows a schematic diagram of the signal time characteristic in the device shown in FIGS. 1 and 2 during short-circuiting to ground potential or zero potential, the upper half of the figure pertaining to the control unit, the middle part to the data to be transmitted in the form of signals, and the lower half of the figure to the peripheral unit.

FIG. 10 shows a schematic diagram of the signal time characteristic in the device of FIGS. 1 and 2 during short-circuiting to ground or zero potential, namely first in the "power up" state ("at power up") of device 100 (also compare FIG. 3 in this context), and then during the actual operation ("during operation").

Figure 11:
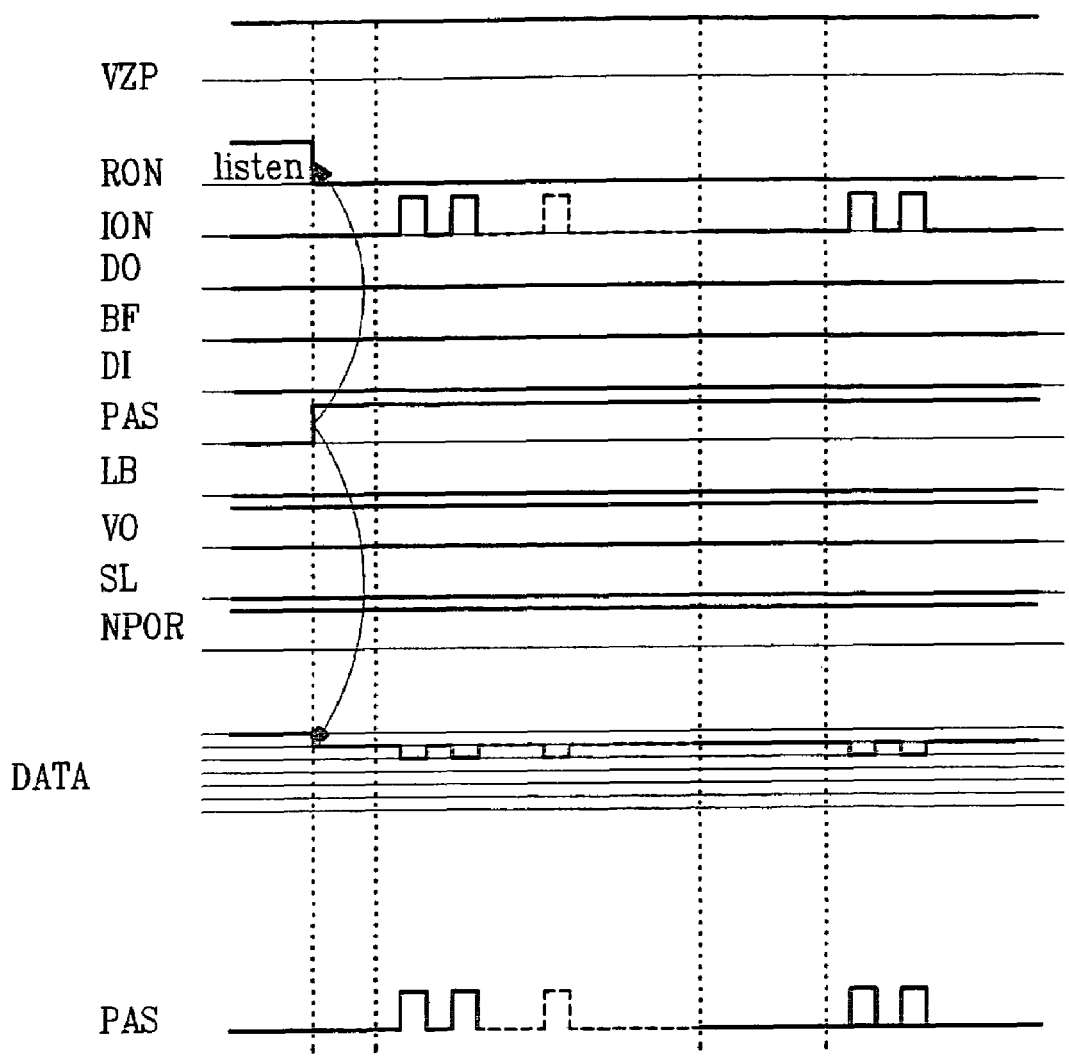
FIG. 11 shows a schematic diagram of the signal time characteristic during data transmission from the peripheral unit of the device shown in FIGS. 1 and 2 to the input current interface PAS interface, the upper half of the figure pertaining to the peripheral unit, the middle part to the data to be transmitted in the form of signals, and the lower half of the figure to the PAS interface.

According to the representation in FIG. 11, present device 100 also allows an operation as PAS interface. To this end, device 100 includes a third current-source unit 44 and 44', each of which is able to be switched by means of a circuit element 66 and 66', respectively, (→reference sign "PAS": PAS mode) and is connected in parallel to current-source unit 40 and 40', respectively.

In summary, the illustrated method and device 100 satisfy the high demands with respect to data rate, data security and cost of the system in the context of the automotive field. Furthermore, the present invention also provides an opportunity to detect data failures during data transmission and to compensate for such data failures, while simultaneously providing improved robustness with respect to EMC influences.

The method and device 100 according to the present invention are able to be utilized independently of a special application, namely wherever a data transmission is desired between at least two communication participants. In addition to the above-mentioned RSI system, an airbag system, drive control, vehicle and brake control as well as transmission control processes and the like present themselves for this purpose. A communication involving other electronic systems, such as window lifters or door locks, with a control device is also conceivable.

What is claimed is:

1. A method for bi-directional transmission of data signals between at least two communication participants on a communication path, the communication participants each having at least one switchable load unit, at least one first switchable current-source unit assigned to the switchable load unit, and at least one comparator unit assigned to the load unit, the method comprising:

temporarily assigning each of the at least two communication participants one of a function of a transmitter for transmission of the data signals and a function of a receiver, wherein:

the switchable load unit of the transmitter is deenergized prior to transmission of the data signals;

the switchable current-source unit of the transmitter is clocked for generating the data signals to be transmitted via the communication path;

the generated data signals are transmitted via the communication path, so that corresponding output signals are produced at the comparator unit assigned to the receiver from the data signals transmitted via the communication path;

the switchable load unit of the transmitter is reenergized after transmission of the data signals; and at least one second switchable current-source unit is connected in parallel to the at least one first current-source unit in each of the at least two communication participants.

2. The method as recited in claim 1, further comprising:

acknowledging to the transmitter that a receive buffer of the receiver is full, by at least one buffer-comparator unit connected in parallel to the comparator unit; and blocking the transmitter when the receive buffer of the receiver is full.

3. The method as recited in claim 2, wherein the data signals are encoded by at least one cyclical code.

4. The method as recited in claim 3, wherein the at least one cyclical code includes the Abramson code, the Hamming code, the Manchester code and the Manchester II code.

5. A system for bi-directional transmission of data signals on a communication path, comprising:

at least two communication participants on the communication path, each of the two communication participants being temporarily assigned one of a function of a transmitter for transmission of the data signals and a function of a receiver, each of the two communication participants including at least one switchable load unit, at least one first switchable current-source unit assigned to the switchable load unit, and at least one comparator unit assigned to the switchable load unit wherein:

the switchable load unit of the transmitter is deenergized prior to transmission of the data signals and reenergized after transmission of the data signals;

the switchable current-source unit of the transmitter is clocked for generating the data signals to be transmitted via the communication path;

corresponding output signals are generated at the comparator unit of the receiver from the data signals transmitted via the communication path; and at least one second switchable current-source unit is connected in parallel to the at least one first current-source unit in each of the at least two communication participants.

6. The system as recited in claim 5, wherein at least one buffer-comparator unit is connected in parallel to the comparator unit in each of the at least two communication participants, the buffer-comparator unit of the receiver being configured to acknowledge to the transmitter that a receive buffer of the receiver is full.

7. The system as recited in claim 6, wherein the system is configured to be operated by the at least one second switchable current-source unit as a system for conditioning of electrical and non-electrical measured variables.

8. The system as recited in claim 6, further comprising:

at least one diagnosis-comparator unit assigned to the communication path for wake-up of the system after the system has been in a sleep state.

9. The system as recited in claim 5, wherein the system is configured to be operated by the at least one second switchable current-source unit as a system for conditioning of electrical and non-electrical measured variables.

10. The system as recited in claim 5, further comprising:

at least one diagnosis-comparator unit assigned to the communication path for wake-up of the system after the system has been in a sleep state.

11. The system as recited in claim 5, wherein one communication participant is configured as a radar control device and the other communication participant is configured as a radar sensor device.

12. The device as recited in claim 5, further comprising:

at least one diagnosis-comparator unit assigned to the communication path for a diagnosis of short-circuit of the communication path to ground.

13. A system for bi-directional transmission of data signals on a communication path, comprising:

at least two communication participants on the communication path, each of the two communication participants being temporarily assigned one of a function of a transmitter for transmission of the data signals and a function of a receiver, each of the two communication participants including at least one switchable load unit, at least one first switchable current-source unit assigned to the switchable load unit, and at least one comparator unit assigned to the switchable load unit; and at least one diagnosis-comparator unit assigned to the communication path for a diagnosis of short-circuit of the communication path to ground;

wherein:

the switchable load unit of the transmitter is deenergized prior to transmission of the data signals and reenergized after transmission of the data signals;

the switchable current-source unit of the transmitter is clocked for generating the data signals to be transmitted via the communication path; and corresponding output signals are generated at the comparator unit of the receiver from the data signals transmitted via the communication path.

14. The system as recited in claim 13, further comprising:

at least one diagnosis-comparator unit assigned to the communication path for wake-up of the system after the system has been in a sleep state.

15. A method of operating a radar sensor interface unit of a radar system, the interface unit facilitating bi-directional transmission of data signals between at least two communication participants on a communication path, the communication participants each having at least one switchable load unit, at least one first switchable current-source unit assigned to the switchable load unit, and at least one comparator unit assigned to the load unit, the method comprising:

temporarily assigning each of the at least two communication participants one of a function of a transmitter for transmission of the data signals and a function of a receiver, wherein:

the switchable load unit of the transmitter is deenergized prior to transmission of the data signals;

the switchable current-source unit of the transmitter is clocked for generating the data signals to be transmitted via the communication path;

the generated data signals are transmitted via the communication path, so that corresponding output signals are produced at the comparator unit assigned to the receiver from the data signals transmitted via the communication path;

the switchable load unit of the transmitter is reenergized after transmission of the data signals; and at least one second switchable current-source unit is connected in parallel to the at least one first current-source unit in each of the at least two communication participants.

16. A radar sensor interface unit of a radar system, the interface unit facilitating bi-directional transmission of data signals on a communication path, comprising:

at least two communication participants on the communication path, each of the two communication participants being temporarily assigned one of a function of a transmitter for transmission of the data signals and a function of a receiver, each of the two communication participants including at least one switchable load unit, at least one first switchable current-source unit assigned to the switchable load unit, and at least one comparator unit assigned to the switchable load unit;

wherein:

the switchable load unit of the transmitter is deenergized prior to transmission of the data signals and reenergized after transmission of the data signals;

the switchable current-source unit of the transmitter is clocked for generating the data signals to be transmitted via the communication path;

corresponding output signals are generated at the comparator unit of the receiver from the data signals transmitted via the communication path; and at least one second switchable current-source unit is connected in parallel to the at least one first current-source unit in each of the at least two communication participants.

17. The system as recited in claim 13, wherein at least one buffer-comparator unit is connected in parallel to the comparator unit in each of the at least two communication participants, the buffer-comparator unit of the receiver being configured to acknowledge to the transmitter that a receive buffer of the receiver is full.

* * * * *